Nov. 26, 1940.        M. D. BERGAN        2,223,202
COATED FITTING
Filed Feb. 9, 1940
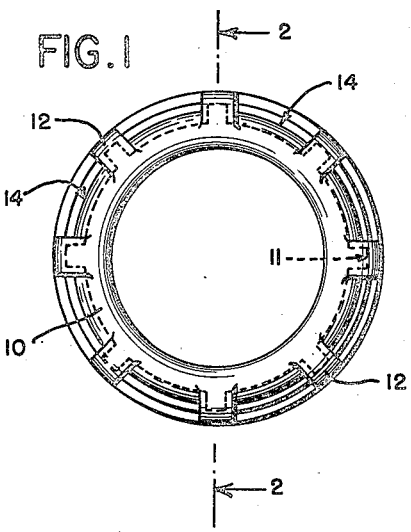
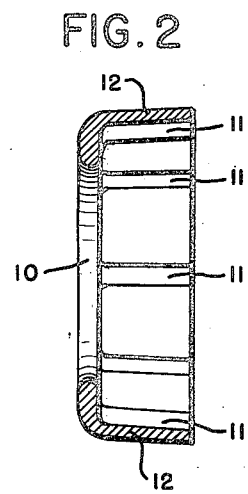
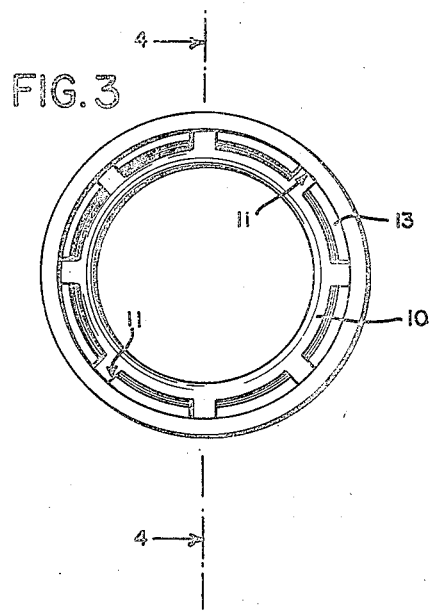
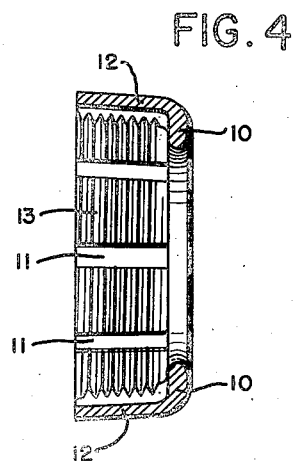
INVENTOR
MARTIN D. BERGAN
BY Bohleber & Ledbetter
ATTORNEYS Patented Nov. 26, 1940

2,223,202

UNITED STATES PATENT OFFICE 2,223,202

COATED FITTING

Martin D. Bergan, Westfield, N. J., assignor to The Thomas & Betts Co., Elizabeth, N. J., a corporation of New Jersey Application February 9, 1940, Serial No. 318,037

3 Claims. (Cl. 85—32)

This invention relates to a fitting having screw threads, such as a bushing or nut, upon which fitting a preserving coating has been applied by dipping the same in a bath of the coating material.

It is an object of the invention to construct a coated bushing or nut or other screw-threaded part or member in such manner as will allow excess coating material to flow therefrom in order to form a protective coating of uniform thickness on the screw threads.

It is another object of the invention to construct a galvanized bushing having internal threads such that excess molten galvanizing material not adhering thereto may flow from the threads and not harden therein, thusly producing a fitting having threads which attain a close and accurate engagement with another threaded part.

Other objects of the invention will be more apparent from the following description taken in connection with the accompanying drawing, illustrating a preferred embodiment of the invention and the process of practicing same, in which:

Figure 1 is an end view of the internally threaded fitting or bushing showing longitudinally extending ridges in the outer surface thereof. Longitudinally extending drain passages or grooves are formed within the fitting when the fitting blank is pressed to form the ridges.

Figure 2 is a cross section through the ring of Figure 1 taken on line 2—2 of that figure.

Figure 3 is an end view of the bushing showing internal grooves extending longitudinally within the fitting and through the screw threads.

Figure 4 is a cross section through the finished bushing and through an internal groove.

Electrical fittings having threads, such as bushings or nuts, are ordinarily coated with a protective material by being immersed in a liquid bath of paint or japanning, or a molten bath of a metal such as zinc. The bushings or fittings thereafter are placed in a basket and subjected to centrifugal and/or a tumbling force which is supposed to throw off the excess coating material. In fittings having threads, such as bushings or nuts, the centrifugal or tumbling force is unable to entirely drain or throw off the coating material not adhering to the threads, at least on that side of the threads away from the center of rotation. In other words, the threads form spiral grooves which hold the molten zinc or coating material therein, and when it hardens, the threads, at least in certain places or on one side, are filled up with the hardened coating material. If an attempt were made to machine or cut away this hardened coating material from the threads, in certain places, the entire coating would be removed leaving the underlying metal unprotected.

The invention is particularly suited for use in connection with internally threaded fittings having longitudinally extending grooves adapted as drain passages through the internal threads. These grooves may be formed therein in any suitable fashion. In the construction of bushing 10 particularly illustrated, internal longitudinally extending passages or grooves 11 are formed by pressing inwardly spaced portions 14 of a blank ring, whereby spaced longitudinally extending external ridges 12 are formed. These ridges provide pipe wrench gripping or driving means for rotating the fitting or bushing to screw it home. After the ring has been pressed into form, the internal threads are formed upon the inner part of the depressed portions and the grooves 11 are deep enough to extend at least to the bottom of the threads. These grooves are relatively closely spaced about the circumference of the threads 13.

The fitting or bushing described may be made of cast metal or stamped from sheet metal. Such fitting or member is coated and finished with a protective material by immersion in a bath of paint, japanning, molten zinc or the like, after which the coated fitting is subjected to centrifugal force. Any excess coating material in the internal threads 13 flows to the longitudinally extending drain passages or grooves 11 under the centrifugal action and passes out of the threads through the grooves. The excess coating material may remain in the grooves 11 and harden there so long as the grooves are deep enough to hold the coating material without interfering with the screw threads when the coating material hardens.

In the illustrated fitting or bushing, the drain passage grooves extend to the end or edge of the fitting, and hence the excess liquid coating material flows out of the passages as well as out of the internal screw threads. The edge of the bushing is, therefore, a point of discharge for the excess liquid coating material, and it is to be understood that any means may be provided for disposing of the excess liquid coating material in the grooves. With the construction described, therefore, all of the coating material flows out of the threads into the longitudinally extending grooves so that no coating material is left to harden within the internal threads. A coating of uniform thickness is therefore provided upon the entire internal periphery and particularly upon the internal screw threads, thusly preserving the original true roundness of said threads.

The fitting or bushing with its liquid drain passages as described is equally successful in eliminating paint or japanning, or other liquid coating material in addition to molten zinc, from the screw threads which has been coated upon the fitting by immersing the same in a bath of the coating material. The invention, therefore, is applicable to any fitting having internal or external threads which is provided not only with a protective coating by immersing the same in a liquid bath of the coating material but also to produce a nice finish and enhance the appearance of the fittings.

This invention is presented to fill a need for a new and useful coated fitting. It is understood that various modifications in construction, operation, use and method, may and often do occur to those skilled in the art, especially after benefitting from the teachings of an invention, and that this disclosure with its appended claims are descriptive of the principles but not limited to the illustrated embodiment of the invention.

What is claimed is:

1. A fitting having internal screw threads, a plurality of spaced grooves longitudinally formed internally of the fitting substantially below the depth of the threads, a coating material on the fitting and being of uniform thickness throughout the threaded portion thereof, said coating material varying in thickness in the several grooves, the thickest coated groove of which is below the screw threads, thereby preserving the true internal roundness of said coated threads.

2. A coated fitting having screw threads, drain passages formed transversely through the screw threads, and a liquid coating applied to the fitting and adhering thereto and hardened thereon as a plating of uniform thickness over the screw threads, the excess liquid coating not adhering to the screw threads being adapted to flow therefrom through the drain passages for maintaining the originally true roundness of said screw threads.

3. A process for coating screw threads on a metallic member, which comprises forming liquid drain passages through the screw threads at an angle thereto, applying a liquid coating material which adheres to the member and its screw threads, draining from the screw threads through the passages that portion of the liquid material in excess not adhering to said threads, thereby leaving a coating of uniform thickness on said threads and thusly preserving their originally true roundness, and permitting the adhered liquid material to harden as a protective coating on the screw threaded member.

MARTIN D. BERGAN.